Nov. 17, 1964    E. W. SHAW    3,156,975
METHOD OF MAKING HEAT INSULATING PANELS
Filed Feb. 16, 1959    2 Sheets-Sheet 1
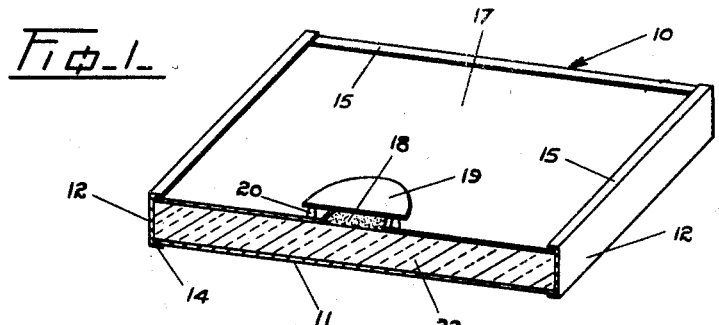
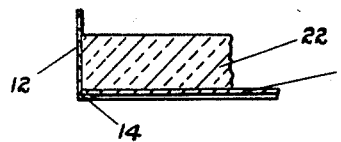
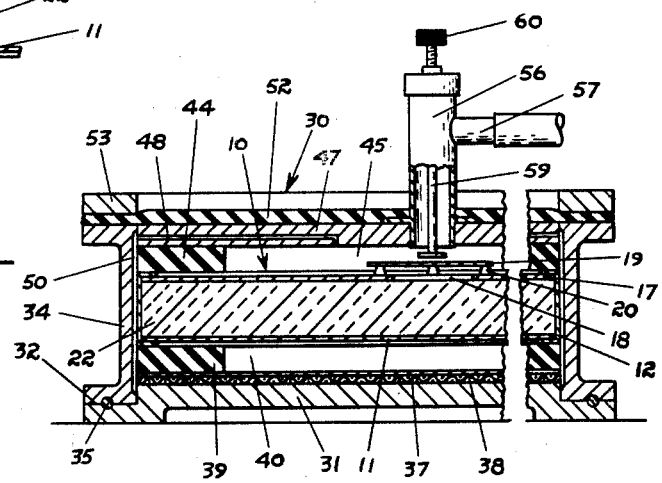
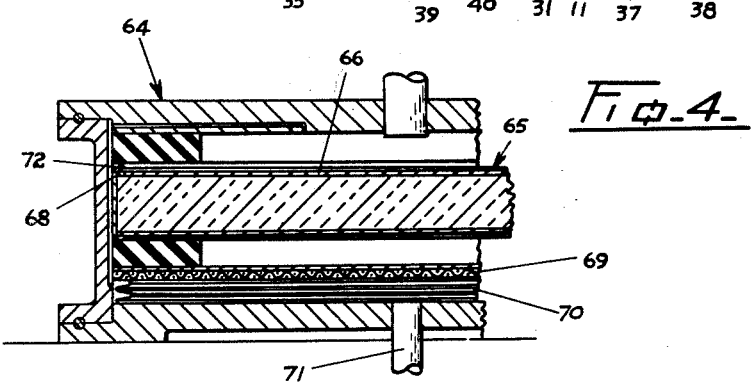
INVENTOR
EDWARD WHARTON SHAW
ATTORNEY Nov. 17, 1964 E. W. SHAW 3,156,975
METHOD OF MAKING HEAT INSULATING PANELS
Filed Feb. 16, 1959 2 Sheets-Sheet 2
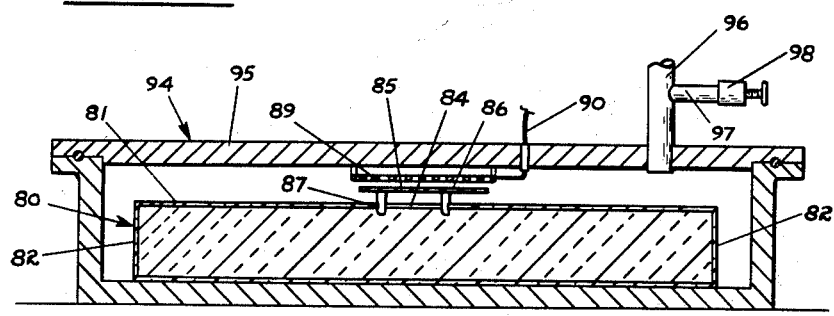
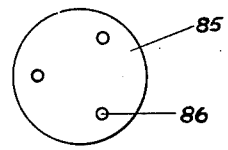
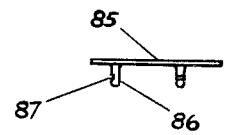
INVENTOR
EDWARD WHARTON SHAW
ATTORNEY

United States Patent Office 3,156,975
Patented Nov. 17, 1964

3,156,975
METHOD OF MAKING HEAT INSULATING PANELS
Edward Wharton Shaw, Gibsons, British Columbia, Canada, assignor to Evacuated Insulation Research Ltd., Gibsons, British Columbia, Canada
Filed Feb. 16, 1959, Ser. No. 793,385
3 Claims. (Cl. 29—471.1)

My invention relates to improvements in a method of producing heat insulating panels.

This invention contemplates improvements in a method of producing heat insulation of the evacuated type. The conventional method of impending the transfer of heat across a temperature gradient is to interpose some form of porous material. Such a material will consist of a solid and a gas phase. Normally the gas will be air and it has long been established that the transfer of heat through still air is less than that through any solid material under like conditions. However, owing to the expansion of air when heated, convection currents are set up and air moving across a temperature gradient will transfer many times more heat than still air. In order to prevent these convection currents it is common practice to introduce any of a great variety of porous materials, having sealed or connecting air spaces of minute dimensions so that the movement of air is impeded by the molecules constantly coming in contact with the widely dispersed surfaces of said material. Such materials are generally of low apparent density and their effectiveness in preventing the transfer of heat is dependent on the average separation of the elements of their structure. Thus the finer materials are the most efficient.

Thus in any insulated space where a temperature gradient is present, part of the heat will be transferred by conduction through the solid phase and part through the gas phase. While the relative amounts of heat so transferred are not precisely known and will vary with different insulating materials, it is well established that the greater portion is transmitted by the gas phase. It follows therefore that if it is desired to improve the efficiency of such insulation the most obvious step will be to remove the gas phase. However, as has been shown, the solid phase would not then be required since its sole purpose is to impede the movement of air.

Thus the most efficient form of insulation at present in use is provided by the well known Dewar flask which consists of two glass vessels, one set within the other, with a highly evacuated space between. The connection between the vessels is only at a narrow neck where they join, so that heat transfer through the glass is reduced to a minimum.

When an attempt is made to produce a form of heat insulation in which the air is removed two very serious practical difficulties are encountered. First an evacuated space must of necessity be surrounded by an envelope impervious to air, and second this envelope will be subject to atmospheric pressure amounting to about 14.7 p.s.i. (pounds per square inch). Dewar overcame these difficulties by making the envelope of glass and in the form of a vessel, cylindrical in shape and of such size that said vessel would withstand atmospheric pressure. The pressure factor has always limited evacuated structures to a cylindrical shape and has restricted size. Until very recently vessels of about two gallons capacity were the largest made. During the last few years the urgent need of the armed forces for means of storing and transporting liquid gases such as oxygen, hydrogen and helium has resulted in the development of large metal Dewar type devices up to 6000 litres capacity. These, however, are still restricted to the cylindrical shape and are extremely expensive since the structure of large area must be capable of supporting atmospheric pressure.

The Dewar flask was a notable breakthrough in the art of heat insulation, but further developments have been lacking and the original invention, the Dewar flask, is still available only for the storage of liquids. Evacuated insulation is not available for independent use in covering large flat or irregularly shaped surfaces. It is the purpose of this invention to show how evacuated heat insulating panels of varying shapes, sizes and thicknesses may be constructed in a simple manner and at low cost. In practice it is frequently desirable to insulate flat surfaces of considerable area, such as the floor, roof and walls of refrigerated trucks and trailers or railroad box cars, or the walls of buildings and cold storage warehouses. In such case this may be conveniently done by covering said walls with a multiplicity of evacuated insulating panels of rectangular shape and one or more sizes, and of such thickness as may be required to obtain the desired degree of insulation. I therefore describe in detail the construction of such a rectangular panel, though it will be understood that the same method may be used to produce panels of different or irregular shapes.

The first consideration is the envelope and it is clear from the foregoing that this will be subject at all times to atmospheric pressure. Rigidity in the final product is therefore indispensable and in addition the size and shape must conform to close tolerances in order that these panels may be readily adapted to their intended use. There are two methods which may be used to construct the envelope; the envelope may be given sufficient strength to enable it to withstand the pressure load, or it may be supported internally by the filler. The first of these alternatives has always been used in the construction of the Dewar flask and it is this choice which has strictly limited design possibilities. Consider for instance the case of a panel 20" square and 3" thick such as might well be used in insulating the flat surfaces mentioned. The area would be 400" square and the pressure load would be about 5880 pounds. A structure of this nature without internal supports is clearly impractical. There have been a great number of attempts to construct flat evacuated panels having the envelope supported by internal members but these members being themselves heat conductors have always reduced the gains from the vacuum to an extent which has rendered the design economically valueless. All such designs have been extremely expensive to manufacture and have been found to have little if any insulating advantage as compared with standard and much less costly materials.

Most conventional types of heat insulation are extremely flimsy and may readily be compressed. In use it is always desirable to avoid this compression because the proportion of the solid phase is thereby increased and the heat transfer correspondingly is greater. Examples of this class of materials are rockwool, glasswool, kapoc, Palco wool and many others. There is, however, another class of porous materials, mostly of a somewhat higher apparent density which may be subjected to pressure without appreciable loss of volume and without increase of conductivity. Examples of these are, silica aerogel, perlite, diatomaceous earth which are in powder form, and pumice, and also charcoal which is a porous solid. It has been shown that all of these materials may be subjected to a pressure of 15 p.s.i. in vacuum and that under these conditions the heat conductivity is very low. As an instance it has been shown that silica aerogel in a plastic envelope and evacuated to a pressure of .001 mm. Hg has a conductivity of .04 B.t.u./hr./sq. ft./in./° F. The corresponding value for conventional porous insulation is from .25 to .30. That is to say that porous materials capable of supporting a pressure of 15 p.s.i. and maintained in a vacuum will have a resistance to the transfer of heat upwards of six times that of insulation now in common use.

In my invention therefore I use one of these porous materials to support the envelope internally, which material is characterized by its ability to support a pressure of 15 p.s.i. without appreciable loss in volume and which may be in powder or rigid form, natural or manufactured. The envelope is used only as a means of containing this filler and of excluding the air and has no insulating value in itself. The actual thickness of the material which may be used in constructing the envelope has been found to be within the range of .002″ to .020″. Since the envelope is constructed of these very thin materials it is obvious that it cannot support any appreciable pressure in any direction and therefore must always rest in completely supported and intimate relationship with the filler.

As has been shown the normal function of porous material in heat insulation is to prevent air movement. According to my invention however, the main object of the porous filler is to support the envelope and thus make it possible to construct said envelope of thin, light and inexpensive material.

The porous material herein referred to may be defined as one in which the cells making up the material are for the most part open and interconnected so as to permit the free passage of a gas therethrough. The material itself may be in powder form but I prefer to employ a compacted preformed slab from which the air can be later evacuated.

It will be understood that there is a wide variety of metals and materials from which the envelope for the porous material may be made, but all must be impervious to the flow of air and while I prefer to use stainless steel, glass or ceramics are quite practical.

The invention is shown in the accompanying drawings in which:

FIGURE 1 is a sectional perspective view of a typical insulating panel with the central opening being shown open and unsealed.

FIGURE 2 is a section of a bottom corner of the panel prior to being fitted with the top plate.

FIGURE 3 is an enlarged section of a processing chamber or jig set to close down and seal the several parts of the panel.

FIGURE 4 is a similar view of a modified form of the jig.

FIGURE 5 is a vertical section of a modification in which the envelope is of glass or other moldable material.

FIGURE 6 is an elevation of the top closure.

FIGURE 7 is a plan view looking up of the top closure.

In the drawings like characters of reference indicate corresponding parts in each figure.

The insulating panel as shown in FIGURE 1 consists of a rectangular envelope 10 having a bottom plate 11, side walls 12 on which bottom and top flanges 14 and 15 respectively are formed and a top plate 17. A central opening 18 is formed in the top plate 17 and a closure 19 is provided for said opening. The closure is shown supported in spaced relation to the top plate 17 by legs 20 of a suitable solder, brazing rod or the like. Enclosed within the envelope is a filler 22 of a suitable porous material such as perlite or silica aerogel, which filler is preferably in the form of a solid preformed slab.

When the insulating panel is installed in the wall or door of a refrigerator or the like, the side walls 12 form a heat bridge extending between the hot and cold sides of the panel. The walls or heat bridge 12 are preferably made from stainless steel foil .002″ in thickness and the bottom and top plates 11 and 17 are preferably of tinned steel sheet .010″ thick.

The panel is adapted to be soldered, evacuated and sealed in a single operation and this is carried out in a processing jig 30, see FIGURE 3. The jig 30 consists of a box-like chamber having a bottom wall 31 which is rebated as at 32 to support vertical side walls 34. A rod 35 of lead or other suitable deformable metal is received in grooves between the bottom and side walls and serves to render the joints completely airtight when the jig parts are clamped together. On the wall 31 is placed a very fine wire mesh screen 37, a sheet of glass cloth 38, and a gasket 39 of silicone rubber or other material having like properties. The side strips forming the gasket 39 define a square central opening 40.

The jig thus far described is ready to receive the insulating panel and this may be made up as follows. A single strip of metal is used to form the side walls 12, which strip is equal to the depth of the panel to be formed plus sufficient material for the flanges 14 and 15. The strip is then shaped to rectangular form and the ends are lapped and preferably united by brazing. The choice of the brazing rod or alloy is important since it must have a melting point considerably higher than the temperature at which any subsequent operation on the envelope is to be performed. In the case of a soldered panel an alloy of 45 percent silver, copper or other metals should be used since this has a melting point of 1145 degrees Fahrenheit. The lower edge of the strip is turned inwardly to form the flange 14, the overlapping ends being neatly folded. The bottom plate 11 is placed in position and the filler 22 which has been previously cut to the exact required dimension is placed on said bottom wall. The top plate 17 with the closure 19 supported upon the legs 20 is next fitted in position and the flange 15 is folded inwardly in the same manner as the flange 14. The contacting surfaces of the flanges and the plates are preferably united by solder and for this purpose are chemically cleaned and fluxed prior to assembly. A convenient way to apply the solder is to tin the contacting surfaces or alternately to insert the solder in ribbon form.

The above described envelope is then placed within the jig 30, the side walls 12 closely fitting the sides of the jig and leaving a minimum working clearance of about .010″. A second silicone rubber gasket 44 having an opening 45 is placed upon the envelope 10 and upon this gasket a slidably mounted plate 47 is fitted. The plate 47 has a plurality of small diameter passages 48 which communicate with the opening 45 and with a number of vertical grooves 50 formed on the adjoining sides of the jig 30. The grooves 50 extend down to the space occupied by the screen 37 and thus are in communication with the opening 40 in the gasket 39. A rubber closure 52 is clamped down upon the upper edges of the side walls 34 of the jig by means of a clamping member 53. The rubber top closure 52 must necessarily be capable of withstanding normal working temperatures up to and above the final melting temperature of the solder forming the legs 20 on the envelope and retain its flexibility. Extending through the rubber top closure 52 and the plate 47 is a vertical vacuum pipe 56 which is hermetically united with said top closure and has a right angularly offset branch pipe 57, which latter is adapted for connection to a vacuum pump, not shown. The vertical pipe 56 is disposed directly over the closure 19 and extending downwardly through said pipe 56 is a screw threaded rod 59 which is adapted to be screwed down in the pipe so as to engage the closure 19. The threaded rod 59 is provided at its upper end with a turn button 60 by which the rod may be screwed down at the appropriate time to thrust the closure 19 down over the opening 18 and finally seal the envelope 10.

In the modified jig 64 shown in FIGURE 4, a different type of envelope 65 is adapted to be processed. The opening and closure therefor has been eliminated from the top plate 66 and said plate is made slightly small to define a gap 68 between its edges and the side walls 12. Beneath the screen 69 a bellows 70 or the like is provided and a tube 71 communicates with said bellows and leads to the exterior of the jig 64. The top flange 72 of the envelope 65 may be left at an angle to the top plate for folding down, as will be later described.

The assembly shown in FIGURES 1, 2 and 3 is placed in an oven wherein the temperature can be regulated and maintained within close limits. Means are provided whereby the branch pipe 56 may be brought through the wall of the oven for connection to a vacuum pump. Means are also provided for operating the turn button 60 from the exterior of the oven. The oven temperature is raised to some point well below the melting point of the solder being used and the vacuum pump is put into operation. The result is that the air starts to flow out of the jig assembly, which as has been shown is now hermetically sealed so that the pressure within the jig assembly becomes less than atmospheric. Since the rubber top closure 52 is flexible it will be acted on by the atmosphere and will exert a pressure on the slidable metal plate 47 which will in turn press on the rubber gasket 44 and the pressure will be passed on successively to the envelope 10, the lower rubber gasket 39, the glass cloth 38, the wire screen 37 and finally the bottom wall 31. As this pressure is applied to the parts mentioned air is being drawn out of the envelope 10 and when the desired vacuum has been attained the heat of the oven is raised the required number of degrees to melt the solder in the various joints and forming the legs 20. Simultaneously with the melting of the solder legs, pressure is applied to the closure 19 by rotation of the rod 59 so as to force it into contact with the top plate 17. This increase in temperature is held only long enough to ensure that the solder has completely melted, which time period must be previously determined by experiment. The oven heat is now reduced but the pump is kept in operation until the temperature has fallen at least 100 degrees Fahrenheit below the melting point of the solder. At the appropriate time the vacuum pump is shut off and the oven is allowed to cool completely so that the jig assembly may be removed from the oven and the completely processed panel may be removed therefrom.

The modified jig 64 with its enclosed envelope 65 is also placed in an oven and the tube 71 is connected to an exterior source of air pressure. The jig and container are evacuated as before with the oven temperature initially being kept just below the melting point of the solder. The vacuum pump draws air from the envelope 65 through the gap 68 and during this evacuation period no mechanical pressure is applied to said envelope since no rubber top closure is present in the modified jig. When the desired vacuum pressure is reached air is admitted to the bellows 70 to force the envelope upwardly and bend the top flange 72 down into contact with the plate 66. The temperature is now momentarily raised to melt the solder and the oven is subsequently cooled to complete the operation.

In evacuating these panels it is necessary to determine at what pressure the lowest conductivity is obtained. This pressure is dependent on the average spacing of the elements of porous material. It has been established that in a porous material the conductivity is lowest when the mean free path of the air molecules is equal to or greater than the average spacing of the elements of the structure. Reducing the pressure beyond that point will not materially improve conductivity. It therefore follows that the finer the structure the higher the pressure at which optimum conductivity is attained.

All porous materials are difficult to evacuate due to absorbed gases which are released only slowly even at very low pressures. The release of these gases however, is greatly accelerated by high temperatures. In a kinetic pumping system set up to evacuate a porous material the gauge pressure will generally be lower than the actual pressure existing in the porous material except after very lengthy pumping. If the vacuum pump is disconnected the gauge will show a rise in pressure. This is due to the absorbed gases which will continue to be released for a considerable period after the pumping has ceased. Fortunately porous materials also exhibit a very strong tendency to reabsorb residual gases upon a reduction of temperature. Thus a heated kinetic evacuating system will show a rise in pressure if the pump is stopped, but if the system is now sealed off and the temperature allowed to drop the pressure will fall, often to a point much lower than was obtained with the pump in operation. In order to obtain the lowest conductivity in the sealed panel the behaviour of gases at low pressure in porous materials must be well understood and the series of manufacturing operations must be planned to take full advantage of this behaviour. In general it may be said that evacuation should take place at the highest possible temperature and the final sealing operation should be carried out as close to that temperature as possible. The time required for the pumping operation is dependent on many factors. Panel size and volume, type of filler, capacity and ultimate pressure of pump and temperature of operating will all influence the time required to attain the required final pressure and this time must be established experimentally for each set of conditions.

The total pressure exerted on each of the jig and envelope components will be the difference between the pressure inside and outside the jig multiplied by the area of the plate 47. It has been shown that it is generally desirable to use thin metals for the envelope but the joining of such materials to produce a vacuum tight container is a matter of considerable difficulty. Thin sheets are extremely flexible and will, if not constrained, weave and warp under the influence of gravity or change in temperature. In order to develop the required tight joint which must have no leak whatever at any point, it is necessary to hold the soldered surfaces in contact under pressure while the solder is melted and until satisfactory flow is complete and the temperature has fallen sufficiently to harden the solder. This pressure moreover must be flexible so that the pressure may be uniformly exerted over the whole length of the joint whose contour will necessarily depart somewhat from that of a straight line. Moreover in the construction shown the corners are folded so that at each corner there will be small area which will be three sections thick and the pressure medium must be able to accommodate itself to this variation. Additionally when the solder melts it is essential that the joint faces shall be forced together to ensure a complete wetting by the solder and to give a thin solder line. It will be seen that these conditions of flexible pressure are satisfied by the arrangement shown. In developing mechanical pressure within the jig by the means shown in FIGURE 3, we shall be limited to a maximum of about 14.7 p.s.i. developed on the surface of rubber closure 52. However, it may be found desirable to develop at the joint line a pressure considerably in excess of this amount. It is for this purpose that the gaskets 39 and 44 are made in this form. If instead of a gasket we interpose a silicone rubber sheet, then under a full vacuum the pressure of 14.7 p.s.i would be effective over the whole surface of the panel. The total load will always be the area of the sliding plate 47 times 14.7 pounds, but the actual pressure on the joint area will vary with the width of the gaskets. Obviously when the modified form of the jig as shown in FIGURE 4 is used, a a pressure much higher than 14.7 p.s.i. may be exerted upon the envelope, if such is desired.

It must be understood that there is a wide variety of bonding agents available which may be chosen in many combinations but the bonding must in all cases take place in proper succession and the time and temperatures cycle must be arranged to suit the bonding means chosen and must also be such as will allow the proper degree of evacuation.

In the modification shown in FIGURE 5 the envelope 80 is made of glass or ceramics and is in molded form having a top plate 81 and side walls 82 which are integral with each other. The top plate 81 is provided with the usual opening 84 to admit filler material in powder form and this powder is tightly packed by vibrating and rotating the envelope. A top closure 85 is provided to seal the envelope and this closure may be of glass and is provided with three or more legs 86 each being provided with a slot 87 on its inner side to engage the perimeter of the top opening 84 and support said closure in spaced relation to the top plate 81. A small flat heating element 89 is provided above the top closure 85 and is energized through circuit wires 90 which lead exteriorly through the walls of the modified jig 94. Suitably disposed on the plate 95 of the jig 94 is a vertical pipe 96 which is adapted to communicate with the interior of the jig 94 and be connected with a suitable vacuum pump, not shown. A branch pipe 97 is taken off of the pipe 96 and is fitted at its outer end with a needle valve 98, which valve is selectively operated to permit air to enter or escape from within the jig 94. The envelope 80 within the jig 94 is now ready for evacuation and sealing and it will be noticed that said envelope loosely fits the jig and is no way confined. The jig is placed in the oven and the temperature is raised to a point between the annealing and softening temperature of the glass while the evacuation proceeds. When evacuation is complete the element 89 is turned on to heat the closure 85 and the area immediately surrounding the closure to a point above the softening point of the glass. The closure 85 then falls onto the top plate 81 and unites therewith to completely seal the envelope. When the sealing operation is completed the temperature of the whole envelope is raised to about the softening point of the glass and while this temperature is held hot air is gradually admitted through the needle valve 98. This has the effect of raising the pressure on the outside of the envelope, so as to cause it to collapse until fully supported by the filler material. After the pressure within the jig 94 has been allowed to reach atmospheric the jig may be allowed to cool slowly and thereafter the finished envelope may be removed.

The jig with its enclosed envelope has been described as being heated in an oven, but it will be obvious that other and perhaps more convenient methods of raising the temperature of the envelope may be used. For example, the jig, which may be of ceramic material or the like, could be fitted with one or more suitably located electrical heating elements so that the envelope temperature could be conveniently and economically controlled.

What I claim as my invention is:

1. A method of making a heat insulating panel formed of an envelope having top and bottom plates and thin planar side walls with top and bottom flanges overlapping the closely spaced marginal edges of the plates, which method consists of treating the envelope parts for bonding together with a heat soluble bonding material, assembling the thin planar side walls with the bottom flanges thereof overlapping the closely spaced marginal edges of the bottom plate, filling the envelope with a wall supporting gas containing porous filler, assembling the top plate with the closely spaced marginal edges thereof overlapped by the top flanges on the thin planar side walls, enclosing the envelope in a jig wherein the side walls are rigidly and closely supported against outward movement and the top and bottom flanges are interposed between resilient members, heating the assembly to a temperature below the melting point of the heat soluble bonding material to degas the porous filler, evacuating the heated assembly, applying resilient and uniform clamping pressure to the top and bottom flanges and subsequently further raising the temperature to melt the heat soluble bonding material and thereby seal and bond the parts of the evacuated envelope.

2. A method of making a heat insulating panel formed of an envelope having top and bottom plates, an opening in the top plate and a closure therefor and thin planar side walls with top and bottom flanges overlapping the adjacent edges of the plates, which method consists of treating the envelope parts for bonding together with a heat soluble bonding material, assembling thin planar side walls with the bottom flanges thereof overlapping the adjacent edges of the bottom plate, filling the envelope with a wall supporting gas containing porous filler, assembling the top plate with the adjacent edges thereof overlapped by the top flanges of the thin planar side walls, initially supporting the closure in spaced relation to the opening in the top plate upon legs formed of a heat soluble bonding material, enclosing the envelope in a jig wherein the side walls are rigidly and closely supported and the top and bottom flanges are interposed between resilient members, heating the assembly to a temperature below the melting point of the heat soluble bonding material to degas the porous filler, evacuating the heated assembly, applying resilient and uniform clamping pressure to the top and bottom flanges, further raising the temperature of the assembly to melt the heat soluble bonding material and thereby seal and bond the parts of the evacuated envelope and simultaneously applying localized pressure to the closure to urge it towards the top plate.

3. A method of making a heat insulating panel formed of an envelope having top and bottom plates, thin planar side walls having top and bottom flanges overlapping the adjacent edges of the plates, which method consists of treating the envelope parts for bonding together with a heat soluble bonding material, assembling the thin planar side walls with the bottom flanges thereof overlapping the adjacent edges of the bottom plate, filling the envelope with a wall supporting gas containing porous filler, assembling the top plate with the marginal edges thereof overlapped by the top flanges on the thin planar side walls and with said side walls spaced from said marginal edges to define a gap, enclosing the envelope in a jig wherein the side walls are rigidly and closely supported and the top and bottom flanges are cushioned, heating the assembly to a temperature below the melting point of the heat soluble bonding material to degas the porous filler, evacuating the heated assembly whereby the envelope is evacuated through the gap, applying pressure to the underside of the envelope to clamp the flanges to the plates and close the gap and subsequently further raising the temperature to melt the heat soluble bonding material and thereby seal and bond the parts of the evacuated envelope.

References Cited in the file of this patent

UNITED STATES PATENTS

| | | |
|---|---|---|
| 1,984,007 | Babbitt | Dec. 11, 1934 |
| 2,128,336 | Torstensson | Aug. 30, 1938 |
| 2,380,811 | Walker | July 31, 1945 |
| 2,621,397 | Black | Dec. 16, 1952 |
| 2,638,187 | Tate | May 12, 1953 |
| 2,686,957 | Koerper | Aug. 24, 1954 |
| 2,747,269 | Atchison | May 29, 1956 |
| 2,821,772 | Billetter | Feb. 4, 1958 |
| 2,824,364 | Bovenkerk | Feb. 25, 1958 |

FOREIGN PATENTS

| | | |
|---|---|---|
| 772,972 | Great Britain | Apr. 17, 1957 |